(12) United States Patent
Takahashi et al.

(10) Patent No.: US 6,272,244 B1
(45) Date of Patent: *Aug. 7, 2001

(54) METHODS FOR EXTRACTION AND RECOGNITION OF PATTERN IN AN IMAGE METHOD FOR IMAGE ABNORMALITY JUDGING, AND MEMORY MEDIUM WITH IMAGE PROCESSING PROGRAMS

(75) Inventors: Yasuko Takahashi; Akio Shio; Sakuichi Ohtsuka, all of Tokyo (JP)

(73) Assignee: Nippon Telegraph and Telephone Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,410

(22) Filed: Aug. 5, 1998

(30) Foreign Application Priority Data

Aug. 6, 1997 (JP) .................................................. 9-212104
Mar. 20, 1998 (JP) ................................................ 10-071094

(51) Int. Cl.$^7$ ................................................. G06K 9/66
(52) U.S. Cl. ........................................................ 382/190
(58) Field of Search ................................... 382/190, 232, 382/284, 156, 157, 199, 205, 206, 209, 217, 218, 275; 348/475; 235/494

(56) References Cited

U.S. PATENT DOCUMENTS 5,060,278 * 10/1991 Fukumizu .............................. 382/14
5,105,468 * 4/1992 Guyon et al. .......................... 382/14
5,479,537  12/1995 Hamashima et al. ................ 382/266
5,862,260 * 1/1999 Rhoads ................................. 382/232
6,026,177 * 10/1991 Mong et al. .......................... 382/156

FOREIGN PATENT DOCUMENTS 05-028273  2/1993 (JP) .

OTHER PUBLICATIONS

Yasuko Takahashi et al., Character Extraction from Gray Images Based on Mathematical Morphology, Dec. 7–Sep. 1992, pp. 219–222.

Yasuko Takahashi et al., Morphology Based Thresholding for Character Extraction, 10/93, pp. 1208–1215.

* cited by examiner

Primary Examiner—Andrew W. Johns
Assistant Examiner—Seyed Azarian
(74) Attorney, Agent, or Firm—Pennie & Edmonds LLP

(57) ABSTRACT

A method for extracting a pre-selected pattern from an image by a programmed computer is able to identify and extract the pattern even under adverse conditions such as presence of noise or shadow in the image or the target pattern is partially shielded. The steps are: storing reference patterns for referencing; storing input images; applying filtering processes to reference patterns and input images; integrating filtered results of the reference pattern and filtered results of the input image to generate integrated results; and extracting a reference pattern according to the integrated results and specifying a location of the reference pattern in the input image. An image abnormality detection can also be performed using the basic method to identify a normal scene and detect a deviation from normalcy even under adverse conditions.

35 Claims, 11 Drawing Sheets

9 ← 202; REFERENCE PATTERN FOR 9

5 ← 203; REFERENCE PATTERN FOR 5

NP

201; ORIGINAL IMAGE

METHODS FOR EXTRACTION AND RECOGNITION OF PATTERN IN AN IMAGE METHOD FOR IMAGE ABNORMALITY JUDGING, AND MEMORY MEDIUM WITH IMAGE PROCESSING PROGRAMS

BACKGROUND OF THE INVENTION

1. Field of the Invention

The present invention relates in general to methods for extracting and recognizing a pattern in an image, and relates in particular to a method for extracting a particular pattern with an image, and identifying a pattern and its location concurrently, to enable automatic recognition of characters on a license plate for example, and relates also to a method for judging an abnormality in an image.

This application is based on patent application Nos. Hei 9-212104 and Hei 10-71094 filed in Japan, the contents of which are incorporated herein by reference.

2. Description of the Related Art

Methods for extracting certain features of an image, such as particular patterns formed by characters, from an image view (shortened to image hereinbelow) using information processing apparatus are reported in "Extraction of letters from shaded image", Journal of Information Processing Society, CV Seminar (Reference A) for example.

Also, conventional pattern recognition methods, especially recognition of license plates, have been performed by a process of preliminary binary conversion of the image, followed by pattern matching. This method is successful if the image is clear and has sufficient resolution, then the characters can be independently binarized so that the results can be analyzed. However, recognition is sometimes difficult or impossible when the image has insufficient resolution or the object is unclear or the images are partially touching, shielded or smeared.

Other methods for pattern matching without binarization are based on correlation factor. This method is able to manage partial image touching and shielding problems, but it is inadequate for dealing with identification problems caused by illumination.

Regarding emergency detection techniques, monitoring cameras are often based on image abnormality detection derived from the above-noted pattern extraction and recognition technologies, therefore, any change in an image can constitute a criterion for abnormality. Judgment that an image contains a change is generally arrived at by computing the difference between a current image and the reference image which would normally be viewed by the camera.

However, although methods which are not adversely affected by shadows are known, as reported in reference A, existing methodologies suffer from a common problem that accurate pattern extraction cannot be carried out in many cases, including the cases when there are noise or shadows in an image or when the pattern to be extracted is locally shielded or when the object is not a character.

With respect to currently available image abnormality detection technologies, when there is obstructive element in the image, shadow of a building for example, these methods will recognize the shadow as an image abnormality thereby generating excessive false warnings.

Also, the extent of abnormality is an important criterion for noting an emergency. However, if a genuine image abnormality exists but it is affected by pseudo effects of building shadow and others, apparent abnormality region in an image and the actual abnormality region do not match and accurate area of the actual image abnormality cannot be established, and the process is unable to reach a correct conclusion.

SUMMARY OF THE INVENTION

It is an object of the present invention to provide a methodology that will enable to reliably extract a target pattern even when there is noise or shadow in an input image or a target pattern in an image is partially shielded. The image recognition technology based on the present methodology enables to reduce the restrictions placed on image recording conditions such as illumination requirements as well as to reduce obstructive effects produced by partially shielded image.

Another object is to provide a recording medium storing the pattern extraction programs to be used in conjunction with information processing apparatus.

Still another object is to provide an abnormality detection method that enables to distinguish pseudo-change in an image, caused by such interference effects as shadow of a building, from a genuine change in the image.

The present method for extracting a pre-selected pattern from an image according to programs in computer means is comprised by the steps of: storing reference patterns for extraction; storing input images; applying filter means to reference patterns and input images; integrating a filtered result of the reference pattern and a filtered result of the input image to generate an integrated result; and extracting a reference pattern according to the integrated result and specifying a location of the reference pattern in the input image.

Filter means are steps to provide a preliminary processing to the image and applying one of either a convolution or first differential processing.

The step of integrating includes a convolution of an inner integral of or an outer integral of or a difference of a reference pattern filter output and an input image filter output.

Filter means also includes a step of weighting of each coordinate point.

In more specific terms, the present method chooses appropriate pre-selected mathematical filters to identify local features in both target pattern and reference patterns and to integrate the filtered results in a macroscopic way, which might be likened to a balloting process.

A local feature is a feature of an image which can be computed using microscopic data in a given local region of a reference pattern.

A macroscopic feature is a feature of an image which can be computed using local features over an entire defined region of a reference pattern.

The present method for recognizing a target pattern, in stored input images, which is similar to a plurality of pre-stored reference patterns and associated pattern locations, is comprised by the steps of: cropping of target regions for determining interim target regions; computing local similarities between the target pattern and the reference patterns in a preliminary processing to obtain intermediate data; computing a degree of resemblance by comparing directional differentiated data of the target pattern and the reference patterns; extracting local patterns according to results of the degree of resemblance to enable selecting similar reference patterns; restoring extracted regions so as to match with an original input image by verifying extracted pattern locations with reference pattern locations; deciding on a matching reference pattern for each extracted region; and outputting recognition results and associated reference pattern locations according to results of comparison.

The target pattern in stored input images include numbers on license plates; and the reference patterns are characters including numerals, dots, kanji, hiragana and alphabet letters in case of Japan.

The present invention includes a computer-readable recording medium for executing a programs to recognize a target pattern in stored input images, comprised by the steps of: cropping of target regions for determining interim target regions; computing local similarities between the target pattern and the reference patterns in a preliminary processing to obtain intermediate data; computing a degree of resemblance by comparing directional differentiated data of the target pattern and the reference patterns; extracting local patterns according to results of the degree of resemblance to enable selecting similar reference patterns; restoring extracted regions so as to match with an original input image by verifying extracted pattern locations with reference pattern locations; deciding on a matching reference pattern for each extracted region; and outputting recognition results and associated reference pattern locations according to results of comparison.

Accordingly, the present method of extracting and identifying a pattern within an input image is based on performing local computational processing first to obtain intermediate data, and a degree of resemblance is calculated using directional derivatives of the intermediate data, and superimposing the extracted pattern with the reference patterns by considering weighting of the processed data. Therefore, the method enables to efficiently and reliably identify a target pattern that resembles reference patterns even when the input image has locally varying illumination, or is partially hidden or smeared. Because the method does not rely on binarized images, but is based on multi-valued gray scale images, much more accurate data are obtained, even when the image resolution is poor, to enable accurate identification of the target pattern. Particularly, when the target object is outdoors, much higher degree of recognition can be achieved compared with the conventional image recognition techniques.

The present invention includes also a method for detecting an image abnormality by comparing a comparison image with a reference image so as to detect a change comprising the steps of: storing a plurality of reference images to be referenced against the comparison image; storing a plurality of comparison images for comparing with the plurality of reference images; specifying a scanning area in the comparison image and in the reference image for detection of an abnormality; applying filter means, to the reference image and the comparison image so as to obtain intermediate data, including a step of applying a local computation and a step of applying at least one processing step selected from the group consisting of a convolution and a first differential processing; and computing a degree of resemblance of comparison image filtered results and reference image filtered results using similarity identification means selected from the group consisting of an inner integration, an outer integration, and correlation; and identifying an abnormality when the degree of resemblance is not more than a specific value, and issuing an abnormality warning as a result of a recognition process.

The abnormality detection method is executed by a recording medium with a computer to carry out the steps of: storing a plurality of reference images to be referenced against the comparison image; storing a plurality of comparison images for comparing with the plurality of reference images; specifying a scanning area in the comparison image and in the reference image for detection of an abnormality; applying filter means, to the reference image and the comparison image so as to obtain intermediate data, including a step of applying a local computation and a step of applying at least one processing step selected from the group consisting of a convolution and a first differential processing; and computing a degree of resemblance of comparison image filtered results and reference image filtered results using similarity identification means selected from the group consisting of an inner integration, an outer integration, and correlation; and identifying an abnormality when the degree of resemblance is not more than a specific value, and issuing an abnormality warning as a result of a recognition process.

The features of the present invention are summarized in the following.

(1) The method enables to extract a target pattern reliably even when noise and shadow are present in the image or when the target pattern such as characters is partially hidden.

(2) The method is effective against such obstructive effects as local variations in illumination, noise, smear, hidden or touching objects. The method is particularly applicable to outdoor images.

(3) The method can be practiced with lesser image resolution, thereby increasing the applicable range of recognition.

(4) The method of abnormality detection is less sensitive to obstructive effects, such as illumination variations and shadowing, to enable to accurately judge a region of abnormality in an image, according a methodology that computes a low degree of resemblance only when a change is produced by a genuine change in the image, not by spurious change such as showing.

DESCRIPTION OF THE PREFERRED EMBODIMENTS

Figure 1:
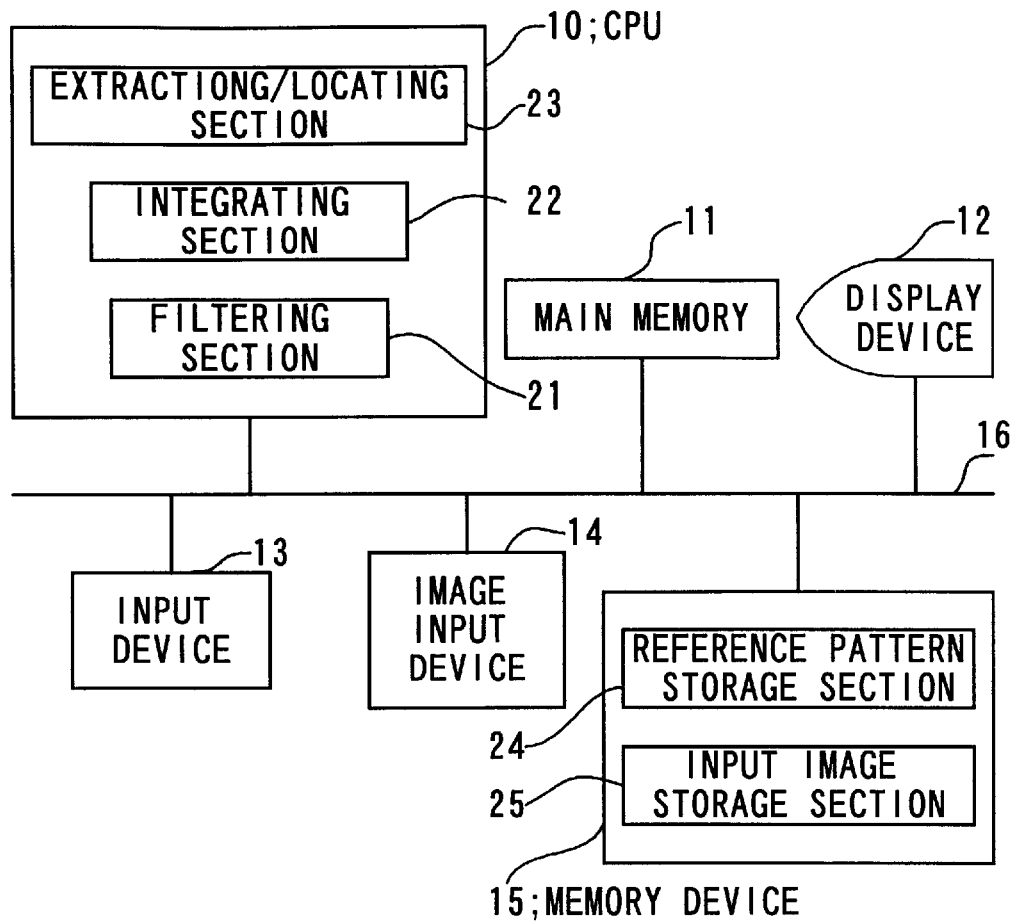
FIG. 1 is a schematic block diagram of an embodiment of the information processing apparatus to perform pattern extraction from an image.

In the following, an embodiment of the method for extracting a pattern from an image will be presented with reference to the drawings. Throughout the presentation, those parts which are common to all the embodiments are given the same reference numerals and their explanations are not duplicated.

FIG. 1 is a block diagram of the information processing apparatus to perform an embodiment of the pattern extraction method of the present invention.

Information processing apparatus (computer) shown in FIG. 1 is comprised by: a central processing unit (CPU) 10 connected through bus lines 16 to a main memory 11, a display device 12, an input device 13 such as keyboard; an image input device 14 and a memory device 15. Image input device 14 is an image recording device which may be a charge-coupled-device (CCD) camera. Reference pattern storage section 24 and input image storage section 25 are provided in the memory device 15.

CPU 10 executes the pattern extraction method according to the extraction programs stored in the main memory 11. FIG. 1 shows a filtering section 21; an integrating section 22; an extracting/locating section 23. Filtering section 21, integrating section 22 and extracting/locating section 23 are functional sections for the CPU 10 to executing the steps of the image processing programs stored in the main memory 11.

Figure 2:
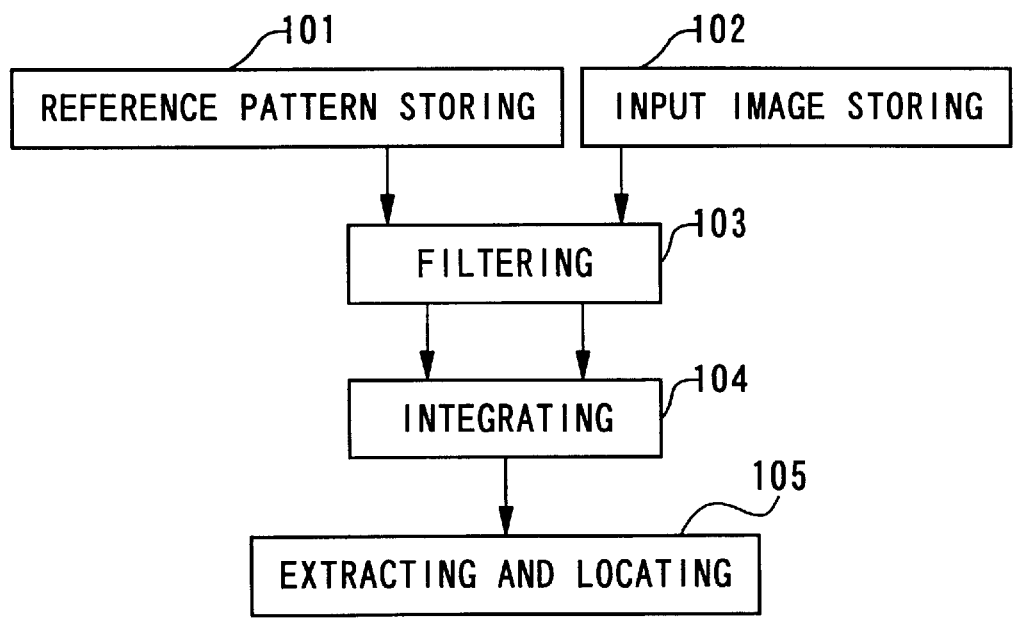
FIG. 2 is a flowchart for processing steps of the pattern extraction method.

FIG. 2 is a flowchart for processing steps for pattern extraction, and the details of the process will be explained in the following.

Initially, reference patterns are accumulated in the reference pattern storage section 24 in the memory device 15 using the image input device 14 (step 101). Reference pattern storage section 24 stores reference patterns with which to compare the pattern to be extracted (target pattern henceforth) from an image.

Similarly, images input from the image recording device are accumulated in the input image storage section 25 in the memory device 15 using the image input device 14 (step 102).

Next, using the filtering section 21, a pre-determined filtering, process is applied to the patterns stored in the reference pattern storage section 24 and the images stored in the input image storage section 25 (step 103).

Next, filtered results of the reference patterns and the input images from step 103 are integrated in the integrating section 22 (step 104).

Next, the extracting/locating section 23 performs actual step of extracting a pattern according to the integration results produced in step 104, and after specifying its location in the reference image, the pattern data is output (step 105).

Filtering process in the filtering section 21 is performed according to some preselected process. It is conceivable that such a filtering process may include a variety of image filtering processes such as first derivatives, second derivatives or others. Also, the filtering process is not limited to single processing, and it is permissible to combine several filtering processes.

In this case, an example of filtering process based on first derivatives will be explained below. First derivatives processing is expressed mathematically as a gradient of a function.

$$\nabla = (\partial/\partial x, \partial/\partial y) \quad (1)$$

Equation (1) can be described as a convolution using a gradient (first differential) of a two dimensional Gaussian function as a filter. The results are vectors, and therefore, it may be possible to regard it as a two filtering processes.

The definition of a two dimensional Gaussian function is:

$$G(x, y) = c \exp(-(x^2+y^2)/(2\sigma_x^2\sigma_y^2)) \quad (2)$$

where $c=(2\pi)^{-1}\sigma_x\sigma_y$, and $\sigma_x$, $\sigma_y$ are standard deviations in the x- and y-directions, respectively.

When an image is considered as a function in a two-dimensional plane, the derivatives are vectors on the plane, and the direction of each vector indicates the direction in which the pixel values are increasing most rapidly and the magnitude of the vector indicates the size of the change in the function.

Figure 3:
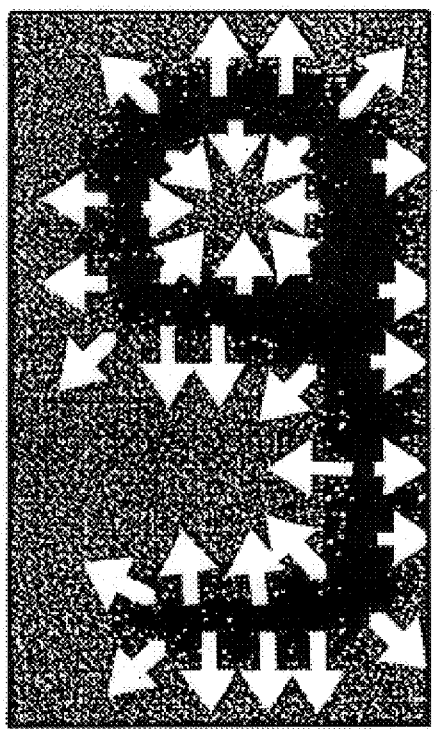
FIG. 3 is a pattern to illustrate a filtering process based on the pattern extraction method.
Figure 4:
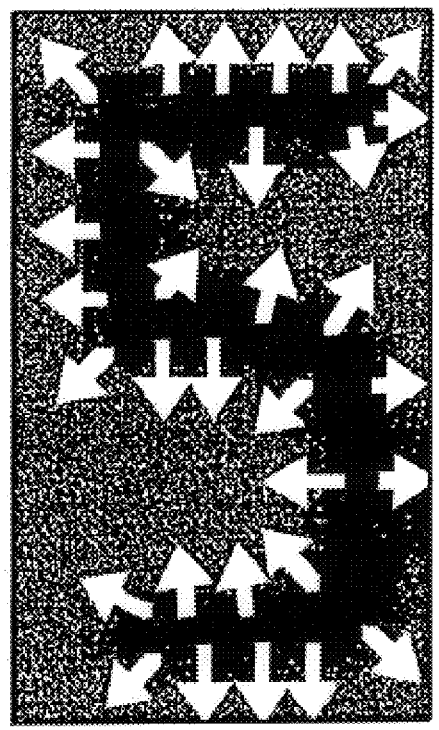
FIG. 4 is a pattern to illustrate a filtering process based on the pattern extraction method.

Therefore, if the image is a character [9] or [5], then its first differential process produces vector fields (arrows) shown in FIGS. 3 and 4, where arrows point in the vector directions and the size of the arrow indicates the vector magnitude (length "0" is not shown).

For example, in the character [9] shown in FIG. 3 or [5] shown in FIG. 4, the first derivative vectors are very similar in the bottom half, but they are different in the upper half. Therefore, when the vector pattern for [9] is compared with a reference pattern for [5], they are somewhat similar but the value is not as high as the case of comparing with a reference pattern for [9]. It should be noted here that similar patterns produce a high value, therefore, two totally different characters produce a low value.

Integration process in the integrating section 22 compares a filtered result of the input image f with a filtered result of a reference pattern $Q_j$ for all the reference patterns $Q_j$ ($j=1, 2, \ldots n$, where n is a total number of reference patterns, and $j$ relates to a reference pattern) and integrates the two filtered results.

A method for such integration may be considered in equation (3):

$$F_j(x,y) = \int\int M_j(u,v) H\{Q_j,f\}(x,y,u,v) du dy \quad (3)$$

where $F_j(x,y)$ relates to an integrated result for each reference pattern $Q_j$; $(x,y)$ relate to coordinates of input image f; and $(u,v)$ relate to coordinates of each reference pattern; $M_j$ is a function to show the degree of contribution made by the point $(u,v)$ of a relevant reference pattern $Q_j$.

It is generally sufficient to use the degree of contribution $M_j(u,v) \equiv 1$ which is the simplest form. However, the degree of contribution $M_j$ becomes very effective when it is necessary to use several reference patterns with which to compare the input pattern, and to emphasize any difference between the input pattern and reference patterns that are similar in appearance. For example, the patterns showing ⌈9⌋ and ⌈5⌋ are relatively similar but the patterns are quite different in the upper right half.

To distinguish between ⌈9⌋ and ⌈5⌋, the difference can be more clearly indicated by adopting a filter which highlights the degree of contribution $M_j$ in the upper right half region so that the precision of the extraction results can be improved.

As an example of such a function, the following expression (4) may be considered.

$$H\{Q_j,f\}(x,y,u,v)=C\{\nabla Q_j(u,v) \bullet \nabla f(x+y, u+v)\} \quad (4)$$

Here, • indicates an inner integral of the vector, $\nabla(=(\partial/\partial x, \partial/\partial y))$ indicates a decomposition filter, C is an odd function that is non-linear and narrowly monotonically increasing and non-decreasing (including monotonic increase), and does not assume a value higher than a pre-determined value.

C can also be an identity function.

Equation (3) is similar to a convolution using the inner integral when the function $M_j(u,v)$ takes on a constant value, when C does not take on a value higher than a given value, generation of excessively high values is suppressed by using a non-linear function C as indicated in equation (4).

Here, function C may be expressed as in equation (5) or as an integral of a Gaussian function with constants $C_1$, $C_2$ as shown in equation (6).

$$C(x) = \begin{cases} c_0 & \text{if } x > c_0 \\ -c_0 & \text{if } x < -c_0 \\ x & \text{other cases} \end{cases} \quad (5)$$

$$C(x) = C_1 \int_{-\infty}^{c_2 x} G(y) \, dy \quad (6)$$

Function $M_j(u,v)$ is used to delete those parts which are not necessary for the pattern extraction process. A point (u,v) having a high value of this function $M_j(u,v)$ exerts a large influence on the integration results $F_j(x,y)$ while a low value would have little effect, for example, in an extreme case, a zero would have no effect on the integration result $F_j(x,y)$. When the function $M_j(u,v)$ is a constant, all the points contribute equally to the integration results $F_j(x,y)$. In practice, a value of the function $M_j(u,v)$ is chosen judiciously to match the category of the image.

Furthermore, when transforms of an image are considered, an integration result $F_j(x,y)$ may be expressed as in equation (7).

$$F_j(x,y) = \int \int M_j(u,v) H\{Q_j \circ A, f\}(x,y,u,v) \, du \, dy \quad (7)$$

where A is a conversion function for operations in two-dimensions such as enlarge, shrink or rotate and o is a composite function such that $Q_j \circ A(u,v) = Q_j(A(u,v))$.

Therefore, function H shown in equation (4) is expressed as in equation (8).

$$H\{Q_j \circ A, f\}(x,y,u,v) = C\{\nabla Q_j(A(u,v)) \nabla A(u,v) \bullet \nabla f(x+y, u+v)\} \quad (8)$$

Here, since A is a function from two-dimensional data to two-dimensional data, $\nabla A(u,v)$ becomes a 2×2 matrix. For example, if A(u,v) is a linear function, then $\nabla A(u,v)=A$ (when a linear transformation is expressed as a matrix, the derivatives match with the matrix themselves at all points).

In the following, a transform to be considered is expressed by $A_i(u,v)$ where $_i$ is an index for a transform pattern($_i$=1,2 . . . m). Therefore, it indicates that the integration results group $F_{ij}(x,y)$ is based on the conversion function $A_i$ and reference pattern $Q_j$.

Accordingly, for each input image f, an integration results group is comprised by $F_{ij}(x,y)(_i=1,2 \ldots m, _j=1,2, \ldots n)$ is obtained.

In the extracting and locating processes performed by the extracting/locating section 23, an actual pattern is extracted from the integration results group $F_{ij}(x,y)$, and its location is computed and output.

As described above, an integration results group expressed by $F_{ij}(x,y)$ is generated for each input image f. These integration results show locally high values in those locations where the target pattern to be extracted in the input image f is similar to a reference pattern.

When the pattern is inverted, because this embodiment uses the inner integral, it will show a localized highly negative peak. Therefore, by replacing those phrases in the above explanation that read "locally high values" with "locally low values", it is possible to extract inverted patterns.

By judging which reference pattern is most likely to be a match for all the integration results, a pattern can be decided for each point, thereby enabling to identify the target pattern and its location.

This technique will be illustrated with reference to FIGS. 5~9 using an actual case of extracting a pattern (image processing example) from an input image. A decision method for the target pattern will also be explained in this section.

Figure 9:
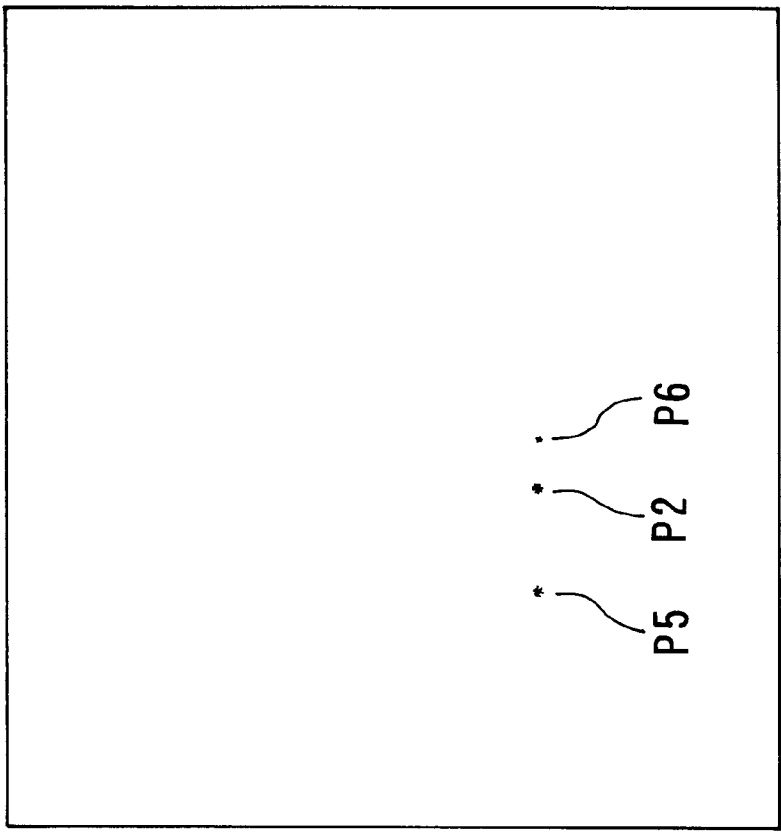
FIG. 9 is another pattern of peak spots of integration results, according the pattern extraction method.
Figure 8:
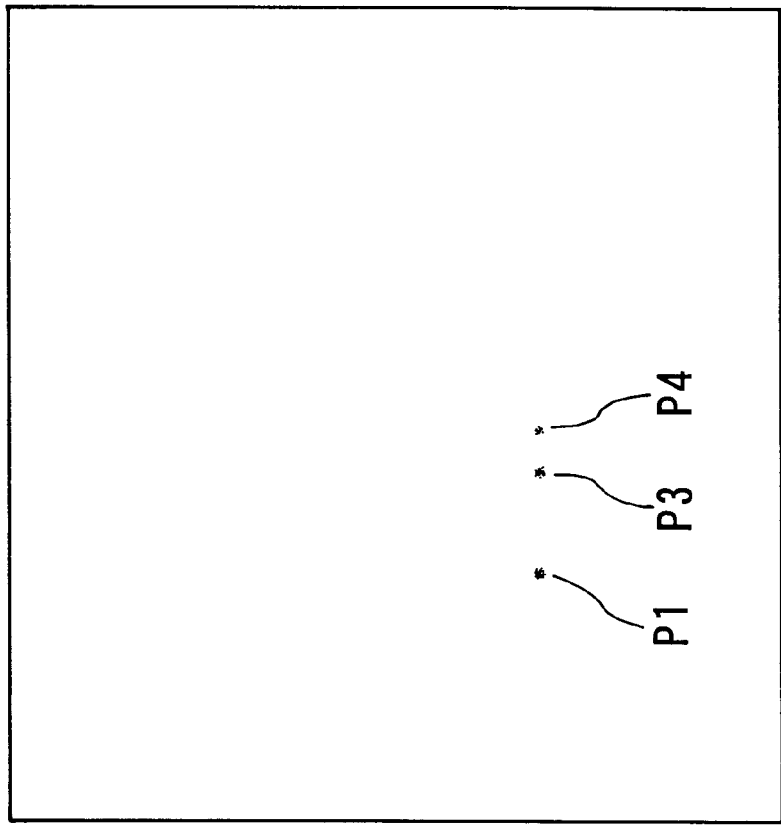
FIG. 8 is a pattern of peak spots of integration results according the pattern extraction method.

FIGS. 8 and 9 show the results of computing the first derivatives as the filtering process for the characters in the license plate, and computing the integration results F, using the function H shown in equation (8).

If the results are to be transformed, the number of output data would be equal to the number of desired variations of each reference pattern, but the results shown in this embodiment have not been subjected to transformations. Therefore, for each input image, the number of output data of integration results is equal to the number of reference patterns.

For example, in the following example, when a reference pattern ⌈9⌋ is chosen, integration results will be referred to as "integration results at filter ⌈9⌋".

Figures 5, 6, 7:
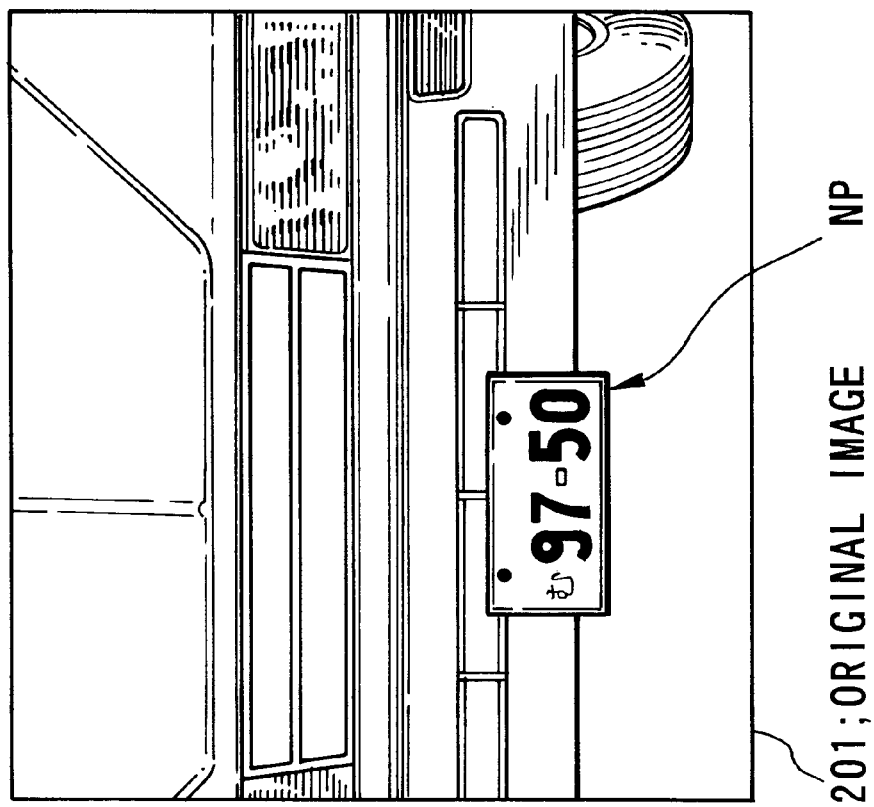
FIG. 5 is a view showing the characters on a license plate.
FIG. 6 is a view of a reference pattern for [9].
FIG. 7 is a view of a reference pattern for [5].

FIG. 5 shows an original image 201. FIG. 6 shows a reference pattern 202 for ⌈9⌋ and FIG. 7 shows a reference pattern 203 for ⌈5⌋. FIG. 8 is the integration results 204 of the original image 201 at filter ⌈9⌋, and FIG. 9 is the integration results 205 of the original image 201 at filter ⌈5⌋.

Reference patterns 202 and 203 for ⌈9⌋ and ⌈5⌋, respectively, are patterns which are cut out of another input image than the original image 201. Also, integration results 204 at filter ⌈9⌋ and integration results 205 at filter ⌈5⌋ shown, respectively, in FIGS. 8 and 9 are presented under different gray scale tones to emphasize the peak value.

FIG. 8 shows that the integration results 204 with filter ⌈9⌋ has a peak value at P1 corresponding to the location of ⌈9⌋ in the original image 201, and FIG. 9 shows that the integration results 204 at filter ⌈5⌋ has a peak value at P2 corresponding to the location of ⌈5⌋ in the original image 201. These pints P1~P6 indicate the coordinate points of the respective reference patterns after applying a filtering process to the license plate NP shown in FIG. 5.

In the case of integration results 204 at filter [9], points P3 and P4 also show relatively high values, but this is caused by the fact that patterns [9], [5] and [0] are mutually similar patterns. It should be mentioned that, according to this technique, the larger the peak value the larger the size of the spot.

Therefore, it can be seen that the peak value of the integration results is higher for the point P1 which corresponds to [9]. Similarly, regarding the integration results 205 at filter [5] shown in FIG. 9, because [9], [5] and [0] are matually similar patterns so that points P5 and P6 indicating [9], and [0] are also relatively high, but the peak value of the integration results is higher at P2 which corresponds to [5].

Therefore, by comparing the peak values, it is possible to decide which filter corresponds best to the input image and its associated location, leading to an extraction of a reference pattern represented by the filter.

The locations of the peaks in the integration results 204 and 205 are displayed on the correct coordinates to correspond to images [9], [5] and [0] for superimposing respective reference patterns. In the integration results 204, the peak for image [9] is shown larger than other peaks for image [5] and [0], and in the integration results 205, the peak for image [5] is shown larger than other peaks for images [9] and [0].

In FIGS. 8 and 9, the integration results were exemplified by reference patterns [9] and [5], but in practice, all the patterns which are intended to be extracted are stored. For example, for Japanese license plates, numeric patterns from [0] to [9] and a symbol pattern [•], making a total of eleven patterns, will be sufficient to recognize the numerals on any license plates.

Integration results are shown mathematically in the following, according to $$M_j(u,v)=1$$

$$C(x)=x$$

and ultimately, an integration result $F_j$ for a pattern j at coordinates x,y is $$F_j(x,y)=\int\int \nabla Q_j(u,v)\cdot \nabla f(x+u, y+v)dudv=\int\int\{(\partial/\partial x)Q_j(u,v)(\partial/\partial x)f(x+u, y+v)+(\partial/\partial y)Q_j(u,v)(\partial/\partial y)f(x+u,y+v)\}dudv \quad (9)$$

It should be noted that it is permissible to use filtering process and integration method other than those illustrated in this embodiment.

For example, first derivatives may be used as a filtering process, and integration may be based on the outer integral. In such a case, the functions $H\{Q_j,f\}$ is expressed as equation (10).

$$H\{Q_j,f\}(x,y,u,v)=\nabla Q_j(u,v)\times \nabla f(x+u,y+v) \quad (10)$$

An outer integral of vectors expresses an area of a parallelogram formed by the vectors, so that smaller the outer integral better the matching of two vector quantities. Therefore, the target point to be extracted is where the outer integral is small.

Another technique is to consider a difference of the filtered results obtained by applying equation (9), according to:

$$H\{Q_j,f\}(x,y,u,v)=|\nabla Q_j(u,v)-\nabla f(x+u,y+v)| \quad (11)$$

$$H\{Q_j,f\}(x,y,u,v)=|\nabla Q_j(u,v)-\nabla f(x+u,y+v)|^2 \quad (11')$$

where || relates to the length of a vector. Equation (11) refers to an error and equation (11') refers to a squared error. For these cases of errors and squared errors, the target extraction point is where the output shows a small number near [0].

Also, for the first differential processing, Sobel differential process may be adopted as a pre-selected filtering process. The results from Sobel differential process are not the two dimensional vectors as described above, but are one dimensional scale value indicating the magnitude of the gradient of the image in each region.

Accordingly, Sobel processing may be carried on an input image and on the reference patterns, by shifting the examination points gradually, and using the non-linear function C to suppress generation of extreme large values (cutoff processing) or if it is an identity function, it is integrated directly (in this case, results are scalers not vectors). The pattern extraction method presented above is considered to be a double-processing technique using filtering and integrating processes.

This method thus provides integration results for pattern extraction technique based on integrating the filtered image data. According to this method, the point having a high (or a low) value of integration result indicates the target pattern to be extracted.

In the examples cited above, f and $Q_j$ may be subjected to a preliminary processing of logarithmic conversion (f→log f).

Because $\nabla(\log f)=\nabla f/f$, which is not significantly affected by the brightness of the image, this is an effective processing option for pattern extraction from an image.

This method of pattern extraction is one which incorporates a preliminary processing in the filtering process.

According to this pattern extraction method, $$H\{Q_j \circ A_i,f\}(x,y,u,v)=|\nabla Q_j(A_i(u,v))\nabla A_i(u,v)-\nabla f(x+u,y+v)|,$$

for example, becomes $$=|\nabla Q_j(A_i(u,v))\nabla A_i(u,v)/Q_j(A_i(u,v))-\nabla f(x+u,y+v)/f(x+y,u+v)| \quad (12)$$

Logarithmic conversion as a preliminary processing has a role of correcting any conflicts in converting analogue camera data of an image to digital data (i.e., A/D conversion). In general, pixel values of an image is proportional to a product of surface reflectance (R) and intensity (I), and logarithmic conversion is carried out to separate surface reflectivity effects from intensity effects:

That is, a pixel value of an image is given by $$g=KIR \quad (13)$$

where K is a constant value.
Logarithmic expression for equation (13) is $$\log g=\log K+\log I+\log R \quad (14)$$

and $$\nabla \log g=\nabla \log I+\nabla \log R \quad (15)$$

Accordingly, when an object of interest is in a shadow, logarithmic conversion of pixel value has a significant effect on decreasing the shadow problems on the pixel value.

This is because a differential process is a type of difference calculation, so that a logarithmic conversion has an effect that a difference in the pixel values at two points becomes proportional to the brightness ratio.

In the above explanation, g is taken to be proportional to IR (in other word, apparent brightness of a point in a view seen by a pixel), but in other cases, depending on design and arrangement of camera optics and A/D conversion, g may be a power function of IR to γ (a constant) or an offset may be added. In such cases, relations can be expressed mathematically so as to enable conversion by table of data so that the difference in the pixel values between two points is proportional to apparent brightness. The following discussion can be applied directly to such processes.

Figure 10:
FIG. 10 is a view of a reference pattern for [5].
Figure 11:
FIG. 11 is an illustration of a shadow on the upper half of an object pattern [5].
Figure 16:
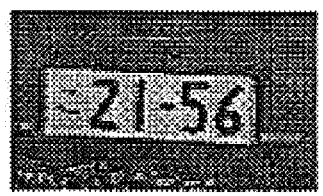
FIG. 16 is a front view of a license plate.
Figure 17:
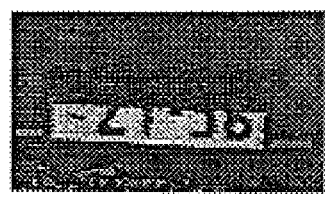
FIG. 17 is a front view of a license plate with a shadowed upper half portion.
Figure 12:
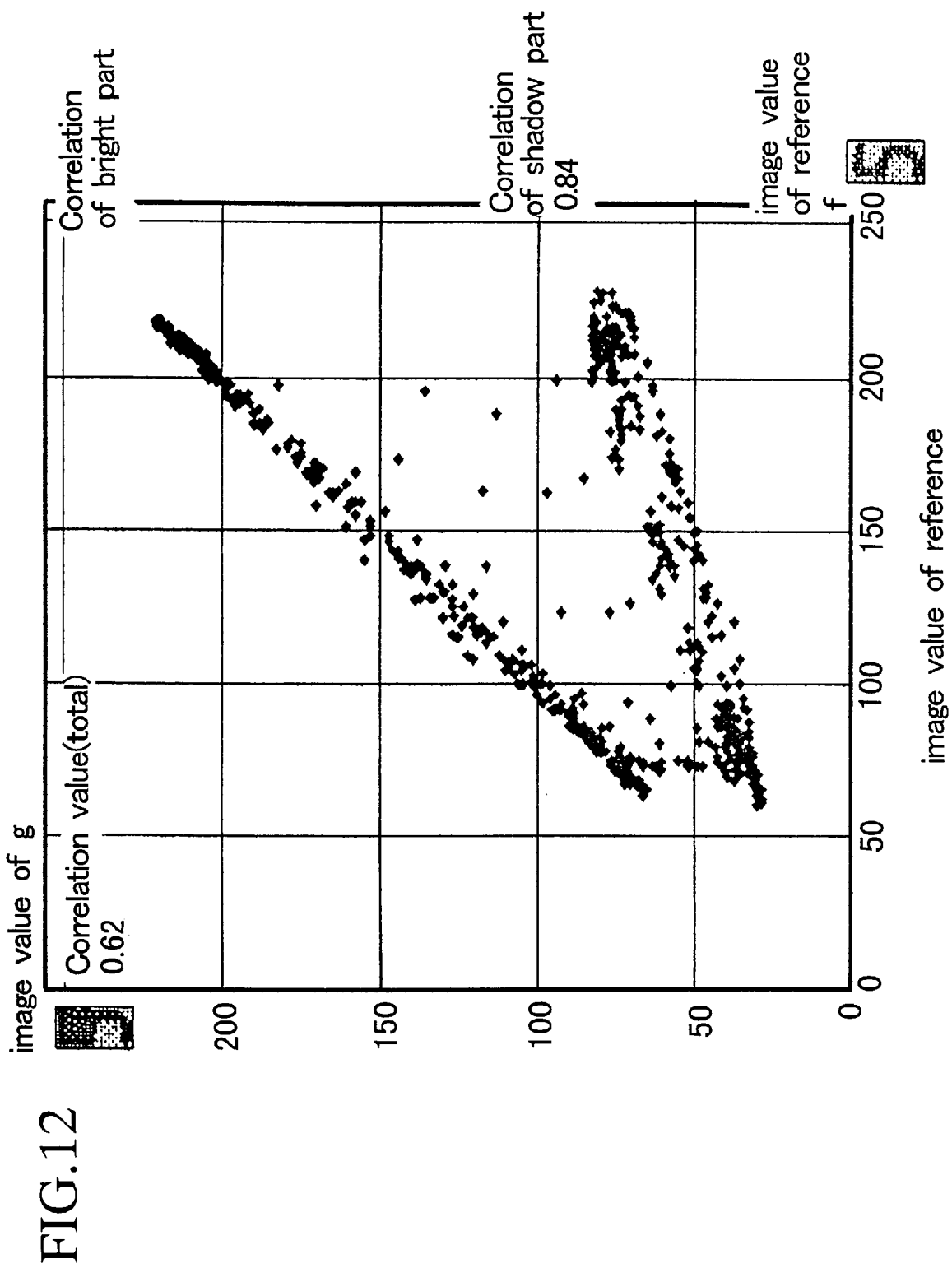
FIG. 12 is a graph for correlation of a reference pattern and pixel values of a target image.

Effects of logarithmic conversion will be explained with reference to FIGS. 10~17. FIG. 10 shows an image of a reference pattern, and FIG. 11 shows a target pattern whose upper half portion is in a shadow. Such a case may occur when the license plate shown in FIG. 16 is shadowed by the building shown in FIG. 17. FIGS. 12~15 are graphs for obtaining correlation factors by applying computational processes to the pixel values at corresponding coordinate locations of the images shown in FIGS. 10 and 11. In FIG. 12, x-axis relates to the pixel values of the reference pattern in FIG. 10, and y-axis relates to the pixel values of the target pattern.

For example, if the pixel value of a coordinate point S in FIG. 10 is 150, and the pixel value of a coordinate point corresponding to S in FIG. 11 is 50, this point in FIG. 12 has coordinates (150, 50). The result is that FIG. 12 represents data for two groups of images.

In other words, in FIG. 12, those points scattered about a line given by x=y correspond to those in the lower half in FIG. 11 where there in no shadow, and the correlation factor is 0.99. On the other hand, those points scattered about a line given by y=0.4x correspond to those in the upper half in FIG. 11 where there is a shadow, and the correlation factor is 0.8. Therefore, the overall correlation factor is 0.62.

Figure 13:
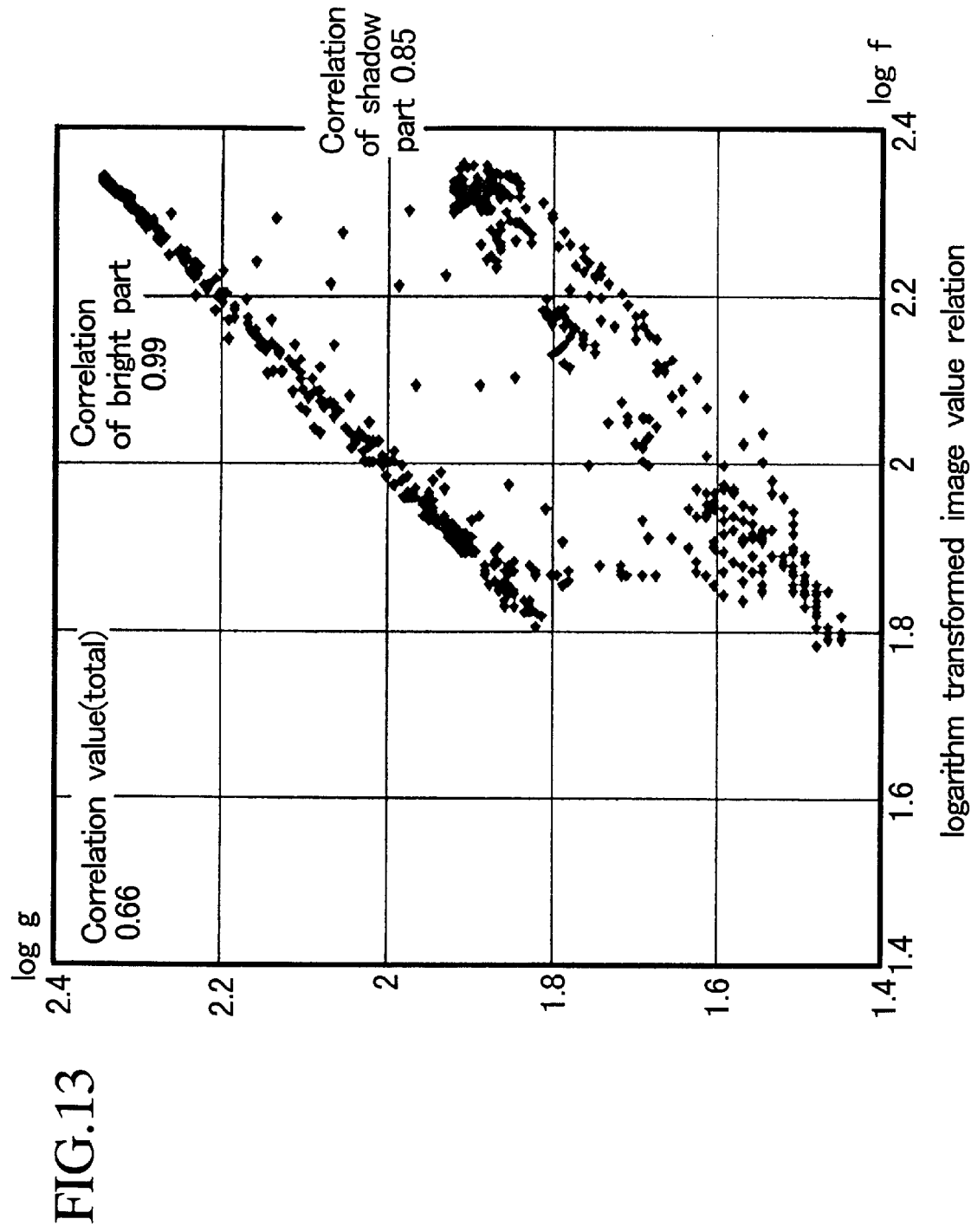
FIG. 13 is a graph for correlation of logarithmic conversion of pixel values of a reference pattern and a target image.

Images shown in FIGS. 10, 11 were subjected to logarithmic conversion, and the converted data are plotted in FIG. 13 in the corresponding coordinate points. Data on the x-axis relate to converted data of the reference pattern pixels, and the data on the y-axis relate to converted data of the target pattern pixels. Similar to the results shown in FIG. 12, two groups of pixel data are seen but the slopes of each group are about the same.

Figure 14:
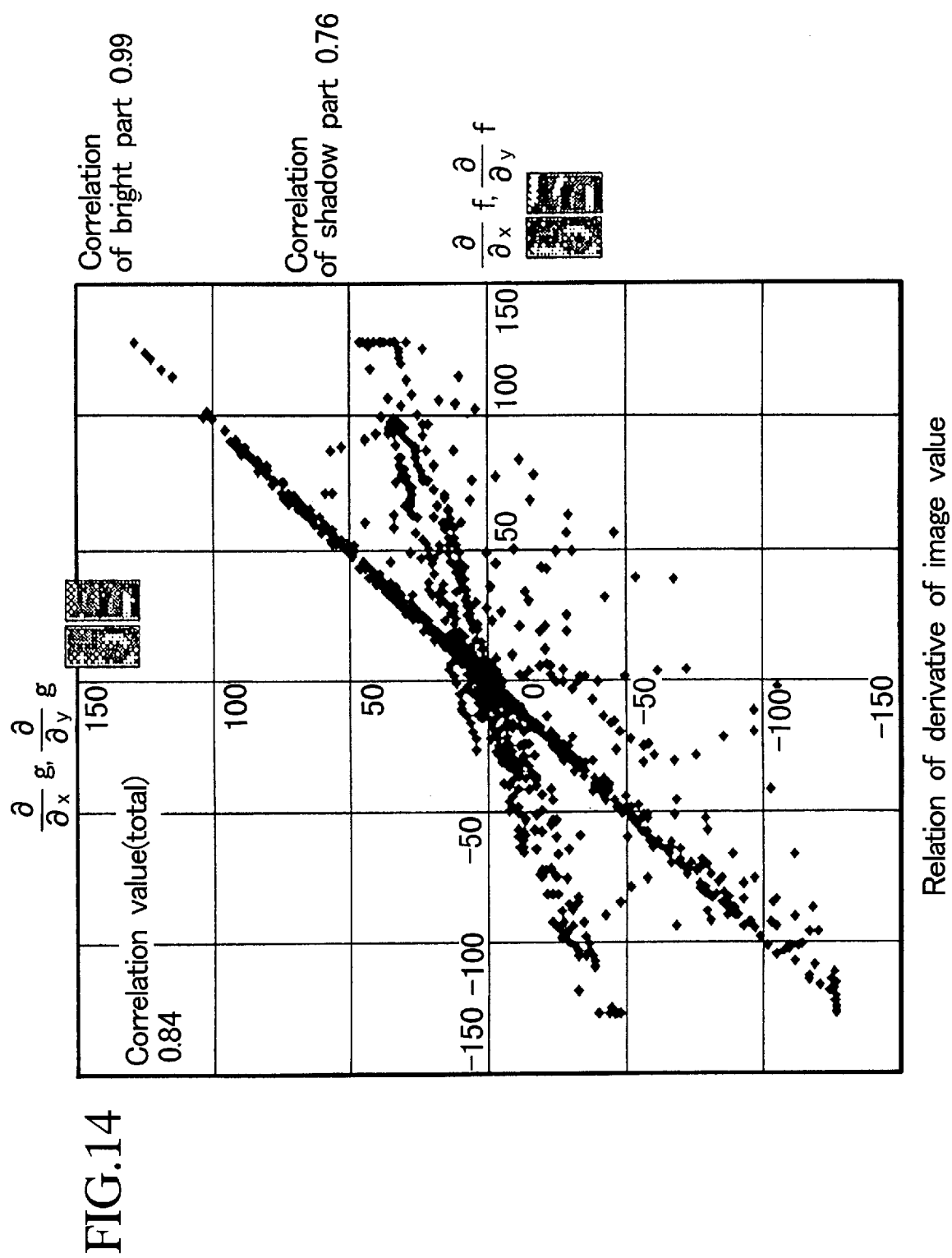
FIG. 14 is a graph for correlation of differential processing of the pixel values of a reference pattern and a target image.

FIG. 14 shows a graph of differentially processed results of the data shown in FIGS. 10 and 11, plotted in the corresponding coordinate points. Actual derivatives values are in two-dimensions, but the x-axis data and y-axis data for FIGS. 10, 11 are superimposed on the corresponding axes in one graph in FIG. 14. In FIG. 14, x-axis relates to the derivatives of the reference pattern pixels and y-axis relates to the derivatives of the target pattern pixels. Similar to the results shown in FIG. 12, two groups of pixel data (correlation factors, 0.99 and 0.76) are seen in FIG. 14, and the overall correlation factor is 0.84.

Figure 15:
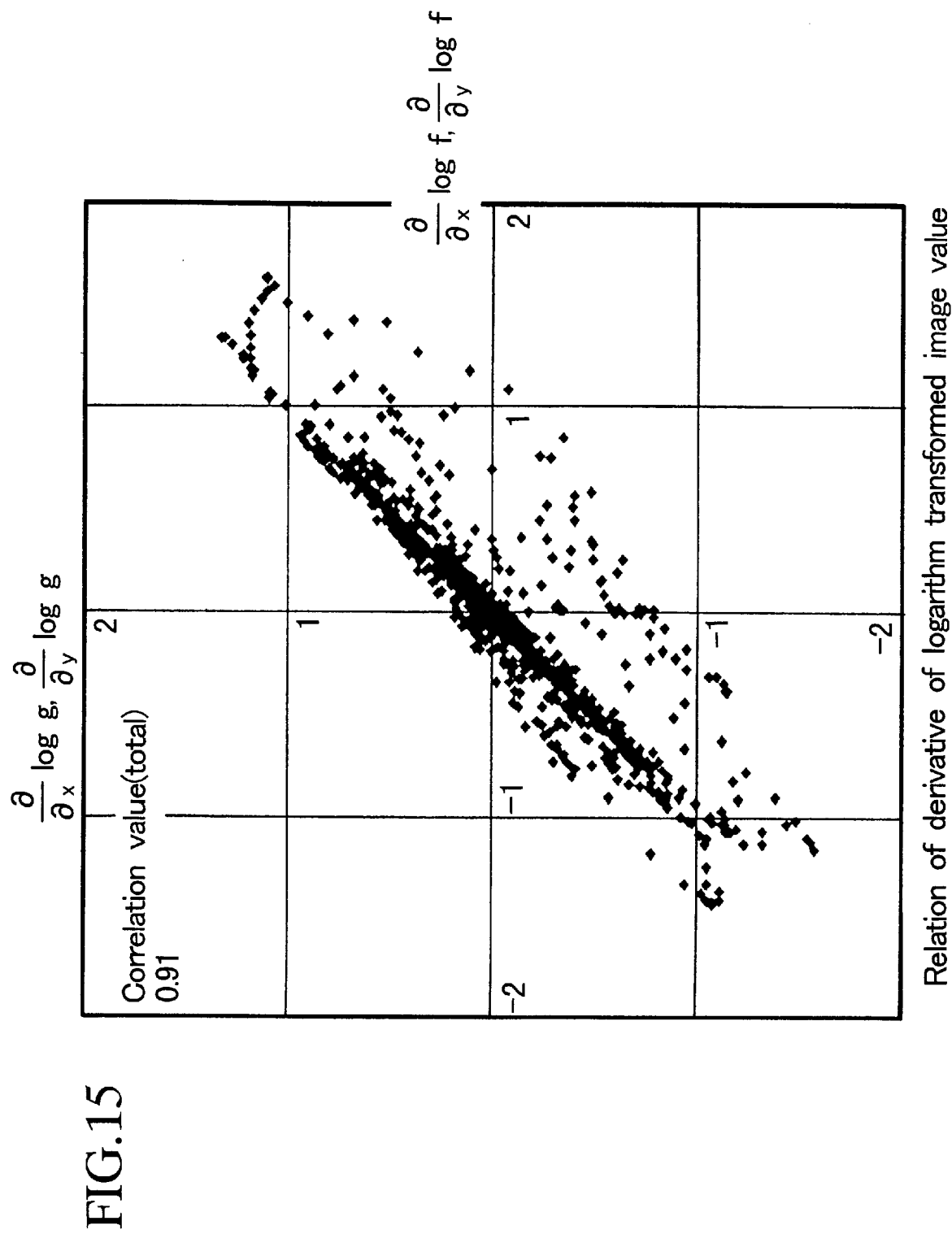
FIG. 15 is a graph for correlation of differential processing of the pixel values of logarithmic conversion of a reference pattern and a target image.

FIG. 15 shows a graph of differentially processed results of the logarithmically converting the data shown in FIGS. 10 and 11, and the results are plotted in the corresponding coordinate points. x-axis relates to derivatives of logarithmic conversion data of the reference image pixels, and y-axis relates to derivatives of logarithmic conversion data of the target pattern pixels.

As seen in FIG. 15, the results are bounded in one group, and the overall correlation factor is 0.91. This result indicate that superior correlation is obtained by using derivatives of logarithmically converted image pixels compared with using those of logarithmically not-converted image pixels, regardless of any integration processing which may be carried out subsequently.

Also, preliminary processing methods adopted in this case are logarithmic conversion and conversion by table, however, other preliminary processing approaches are applicable, such as median filter, averaging by convolution using Gaussian functions, local Fourier conversion, wavelet conversion, edge emphasis processing as well as other modes of preliminary processing including first derivatives of the preliminary processing or any combination of the techniques described above.

Furthermore, by a judicious use of the weighting function $M_j$ for the degree of contribution, several characters can be extracted with one category with the present method of pattern extraction. This method will be explained in the following.

First, examine the shape of each of the numeral [0], [2], [3], [5], [6], [8] and [9]. These numerals can roughly be grouped in a vertically oblong shape. For example, reference pattern $Q_j$ is designated as [0], and the values of the function $M_j$ is selected to be high on the outline while they are low inside the outline.

According to this approach, this category would output high values not only for [0] but for others having an oblong outline. For example, it can be recalled that the integration results 204 at filter 9 shown in FIG. 8 exhibited relatively high values for [0] and [5] even though they were subjected to a [9] filtering. This observation indicates that by emphasizing the boundary characteristics by using the $M_j$ function, desired results may be obtained.

According to the present pattern extraction method, it is possible to eliminate adverse effects of non-uniform illumination, represented typically by shadows, because of the application of filtering process (differential processing) to both the reference pattern and the input image.

It can be seen that, although local noise in the input image is emphasized by the filtering process, because the noise is generally confined to local points, an overall integration process for filtered reference pattern and input image enables to identity significant characterizing features of any reference patterns in the input image, thereby minimizing the adverse effects of local noise. Also, even when the target pattern is partially hidden or smeared, if the unaffected regions are large enough, identification of a reference pattern is possible ultimately, as in the case of local noise.

Figure 18:
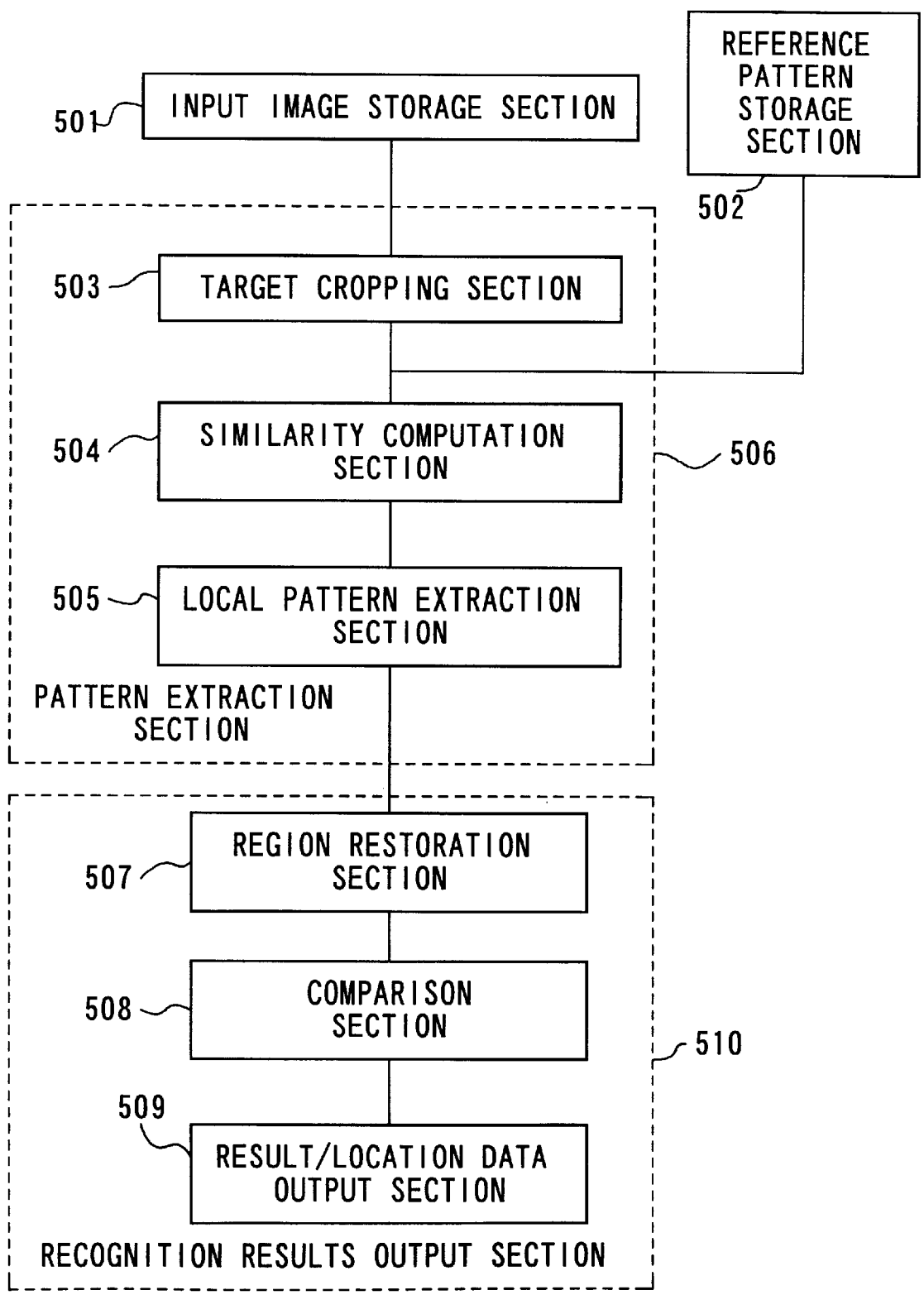
FIG. 18 is a flowchart for a process of pattern recognition.

Referencing FIG. 18, an embodiment of the present method for pattern recognition will be explained. FIG. 18 is a block diagram of the system programs for recognizing a target pattern. The overall program is comprised by: input image storage section 501; reference pattern storage section 502; target cropping section 503; similarity computation section 504; local pattern extraction section 505; pattern extraction section 506; region restoration section 507; comparison section 508; results/location data output section 509; recognition results output section 510. The steps to be carried out in these sections are described in application programs recorded on a computer-readable memory medium and are executed by a computer system including CPU and memory devices.

Input image storage section 501 describes steps for storing images recorded by such means as camera and contains the image data to be subjected to the recognition process. The data may be any type of binary image, multi-valued gray image or color image.

Reference pattern storage section 502 similarly stores reference patterns for enabling extraction and recognition of a target pattern within the image. Image types are the same as the input image types, and a plurality of reference patterns are stored. Extracted patterns and reference patterns correspond one to one, and the result is directly tied to all the identified results.

Target cropping section 503 performs cropping of a target region from an input image stored in the input image storage section 501. Although dependent on the method used in similarity computation section 504, a target region must be cut out so as to be directly comparable with reference patterns. For example, when using the correlation factor to judge the degree of resemblance, the reference pattern and the target region must have the same size and shape. Although the present cropping method is based on directional differentiation, it is still necessary to match the size and shape of the target image to those of the reference pattern as in other methods.

The simplest method of cropping is to cut out all the regions of the image which matches a reference pattern one by one, for every possibility. If a region to be compared can be limited by some preliminary processing, there is no need to cut out all the region. Also, if a series of processing includes the size of a reference pattern and the shape transforms, it is necessary to cut out the target object to match the shape transforms.

Similarity computation section 504 is a program to compare the cropped region produced in target cropping section 503 with the reference patterns. Method for computing the degree of resemblance will be explained later. However, a condition for carrying out this processing step is to be able to decide, based on the results of the degree of resemblance obtained by comparing reference patterns with the target pattern, which reference pattern most resembles the target pattern in the steps to be carried out in the succeeding local pattern extraction section 505.

After the target pattern is decided, local pattern extraction section 505 compares similarities between the target pattern and each reference pattern decided in the similarity computation section 504, and selects a reference pattern which most resembles the target pattern.

Pattern extraction section 506 includes steps 503~505. If the target pattern has already been selected from one object image, recognition result is the reference pattern to match this object image. However, there are generally a number of target patterns in an input image, therefore, it is actually necessary to specify the location of a target pattern, and this process is carried out in recognition results output section 510 which includes steps 507~509.

Region restoration section 507 matches the extraction results of the target pattern in the input image, in other words, matches the location and shape data of the extracted pattern obtained in the pattern extraction section 506 in those of the input image.

Comparison section 508 compares the region and degree of resemblance of the returned pattern on the basis of each region of the target patterns.

Results/location data output section 509 displays the reference pattern resulting from the recognition process and its location data.

Examples of performing steps in region restoration section 507, comparison section 508 and results/location data output section 509 will be explained later.

Recognition results output section 510 outputs recognition results on the basis of the restriction conditions used for pattern extraction results for the originally desired target.

Methods for computing the degree of resemblance performed in the similarity computation section 504 will be explained in detail. There are several methods available to perform computations of degree of resemblance.

For example, if the input image is a binary image, two patterns are normalized and superimposed (size matching), and count the number of bits which do not match. In this case, the lesser the number of unmatched bits the more similar are the, images.

For images with no binary conversion, that is, for multi-valued gray images which are processed directly, a correlation factor may be used. In this example, directional first-order differential method will be briefly explained. The following explanation is based on the pattern extraction and integration method described in the embodied pattern extraction method presented above.

The following equations to explain the method include $Q_j$ which relates to one reference pattern, and f which relates to a target recognition region. These are functions defining a two-dimensional space (x, y), and because they represent target recognition object and a reference pattern, the regions defined by these functions must essentially be the same region. Gradient (directional differential) is the same as equation (1), which is $\nabla = (\partial/\partial x, \partial/\partial y)$.

That is, $$\nabla f(x, y) = (\partial f/\partial x, \partial f/\partial y)(x, y) \qquad (16).$$

The equation is comprised by general mathematical expressions, gradient $\nabla f$, first derivatives in a two-dimensional space, and partial differentials $\partial/\partial x, \partial/\partial y$.

The method of computing the resemblance will be explained using these equations. The basic approach is to compare $\nabla Q_j$ and $\nabla f$. There are many comparison methods which may be considered. In the pattern extraction method presented above, the inner product formed a base, but other approaches such as calculating sums of the difference between $\nabla Q_j$ and $\nabla f$ or their correlation factors, or sums of the difference between $\nabla Q_j/Q_j$ and $\nabla f/f$ or their correlation factors. Also, in the above embodiment, considerations were given to reference pattern transforms and weighting for each region of the reference pattern, and the same considerations are applicable here also.

When the correlation factors are computed according to the method presented in the previous embodiment, one degree of resemblance is determined numerically in each target pattern for each reference pattern. It is clear that this satisfies the conditions for the similarity computation section 504.

To calculate the correlation factor, because the data are in a two-dimensional space, inner products are generally used in the product (scaler product) of correlation factors. This is shown mathematically as:

$$F_j(x,y) = \int\int \nabla Q_j(u,v) \cdot \nabla f(x+u, y+v) du dy / (\|\nabla Q_j\|^2 \|\nabla f(x+\bullet, y+\bullet)\|^2) \quad (17).$$

However, in equation (15), $$\|\nabla Q_j\|^2 = \int\int \nabla Q_j(u,v) \cdot \nabla Q_j(u,v) du dy \qquad (18)$$

and $$\|\nabla f(x+\bullet, y+\bullet)\|^2 = \int\int \nabla f(x+u, y+v) \cdot \nabla f(x+u, y+v) du dy \qquad (19).$$

It is obvious that instead of $\nabla Q_j$ and f, results of logarithmic conversion can be used. In such a case, all $Q_j$ will be replaced with log $Q_j$ and all f with log f. Transforms and degree of contribution can equal be added to the analysis.

Next, the execution method of recognition results output section 510 comprised by region restoration section 507, comparison section 508 and results/location data output section 509 will be explained in detail.

When there is only one pattern in an input image to be extracted (recognized), such as an optical character reader (OCR) which defines both location and size of a character, the recognition result will be a reference pattern, selected from all the reference patterns, which most resembles the input image. However, when there are a number of target patterns in an input image, it is necessary to consider that some target patterns may be repeated within the input image.

For this reason, region restoration section 507 processes the target pattern extraction results so that the extracted pattern region of the input image will be compared with a reference pattern of the same size. The pattern data for comparison will include location information and the shape information of the selected reference pattern.

An example of the execution method will be explained. In the following, high resemblance means that a reference pattern resembles the extraction result. First, a region of the same size as the input image is prepared so that each point in the region corresponds to each point in the input image. Recognition results are "pasted" inside this region to respective points to indicate that comparison process is in-progress.

It suffices for the content of the pasted data to include recognition results and its location. The pasting point is the same region as the region of the extracted pattern in the input image. This pasting is performed by the comparison section 508 which decides the sequence of pasting according to the degree of resemblance, in such a way that pasting regions, for pasting the data produced from the local pattern extraction section 505, will be reserved in the order of the degree of resemblance.

Comparison section 508 ignores those recognized patterns of low resemblance which are to be superimposed on the pasting region of high resemblance.

FIGS. 19~22 supplement the explanation of the execution of recognized results output section 510.

Figure 19:
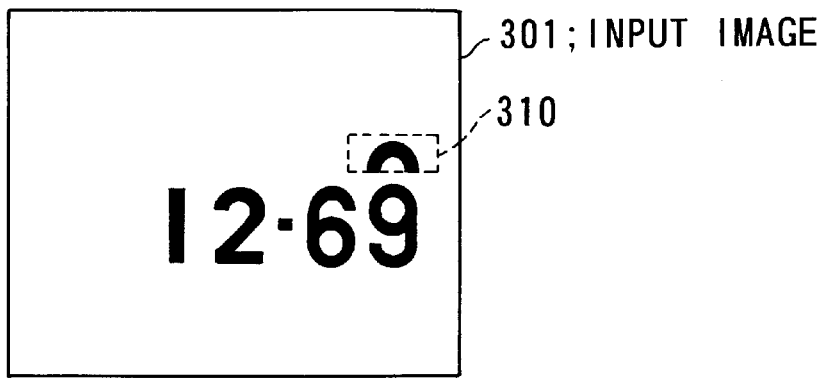
FIG. 19 is an illustration of output processing section 510 in FIG. 18.

In FIG. 19, an input image 301 is a license plate. It can be seen that a semicircular shape noise of about the same linewidth as the numerals in the license plate exists above a numeral [9].

Figure 20:
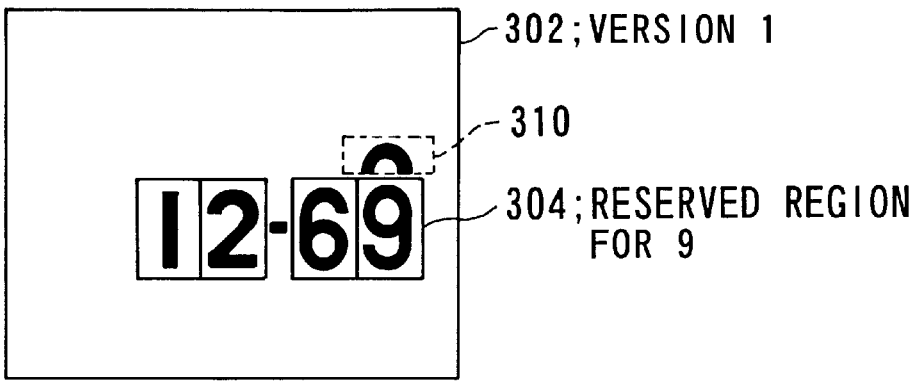
FIG. 20 is another illustration of output processing section 510 in FIG. 18.

In FIG. 20, a version 302 is an example of a recognition result obtained using reference patterns of numerals. In this view, versions for [1] [2] [6] [9] and the extent of the region to be reserved for each reference pattern are shown superimposed on each other. Space 304 relates to the reserved region for a numeral [9].

Figure 21:
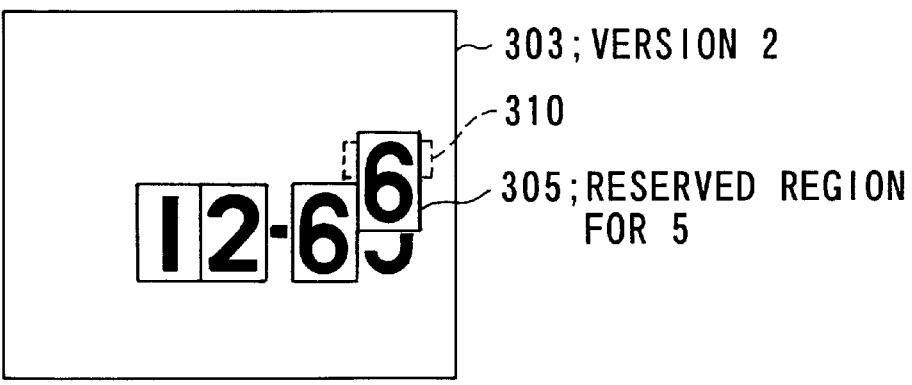
FIG. 21 is another illustration of output processing section 510 in FIG. 18.

In FIG. 21, version 303 is a result of interpreting [9] to be [6], because of the noise existing above the reserved region for [9]. Therefore, a reserved region 305 is associated with the incorrect recognized result [6].

Figure 22:
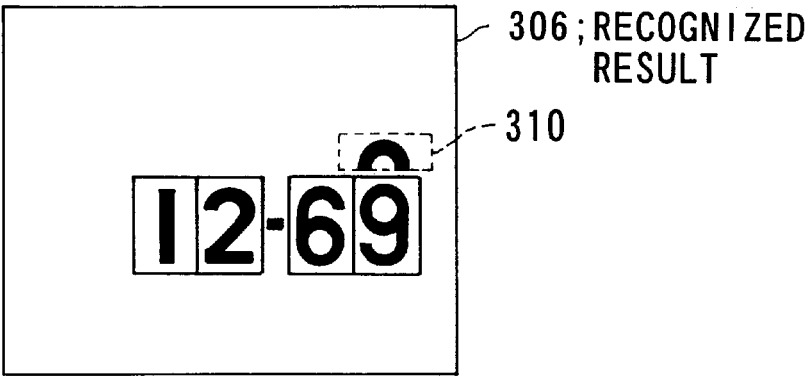
FIG. 22 is another illustration of output processing section 510 in FIG. 18.

In FIG. 22, recognized result 306 is dependent on the state of the image, the choice for the fourth letter against [9] and [6] will be [9] on the basis of resemblance. In this case reserved regions 304 and 305 will be superimposed, because the reserved region 304 has a higher resemblance, the version contained in the reserved region 305 will be ignored.

Those regions corresponding to the reference patterns are thus restored, and enables an interpretation without contradictions.

Ultimately, the recognized results [1], [2], [6], [9] are checked for their alignment and the finalized recognition result is output.

Another execution method may be to consider a reverse procedure of pasting, such that the patterns with low resemblance are pasted first while allowing overwrite. This method will produce results identical to comparison section 508.

The same results may also be obtained by building non-invasive regions around the region of the recognized reference pattern in the order of high resemblance.

Results/location data output section 509 re-aggregates the remaining recognition results obtained from the steps described above. Those regions considered to contain characters of the highest degree of resemblance will not be allowed to accept other results so that the final results will always be separated individually and will not be superimposed.

When the location data of input pattern and reference pattern are correlated, as in the case of letters, processing steps can include such location information. For example, in Japan, letters and numerals on a license plate are limited to predetermined kanji, hiragana, alphabet and numerals, and their locations and arrangements are strictly specified. For this reason, final results are output only when the location data of the reference patterns coincide exactly with the arrangement of the input target patterns.

Figure 23:
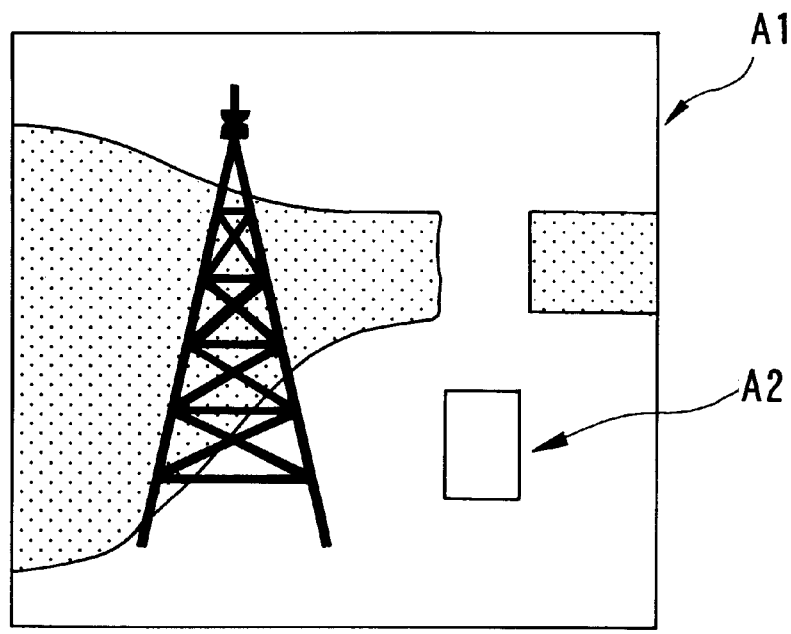
FIG. 23 is a reference image A1 used in an embodiment of the image abnormality detection method.
Figure 24:
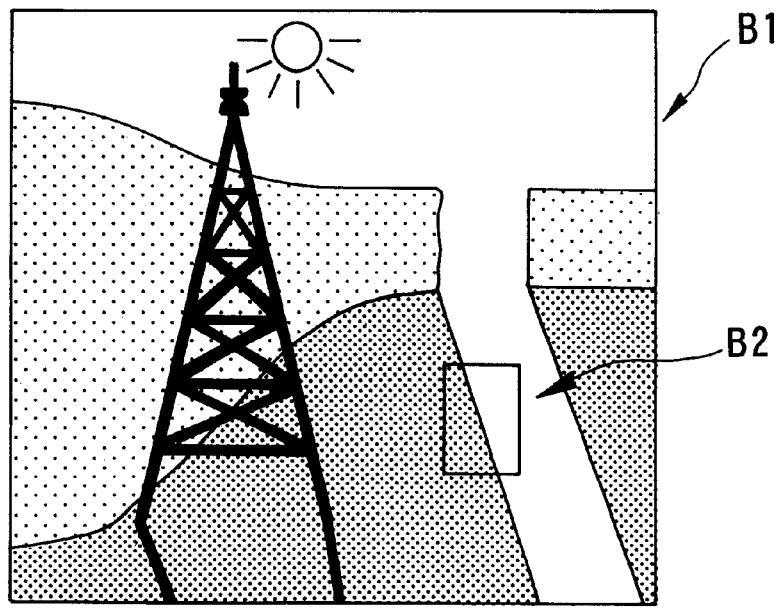
FIG. 24 is a comparison image B1 used in an embodiment of the image abnormality detection method.

An abnormality detection method will now be explained with reference to FIGS. 23 and 24. The steps to be carried out are described in application programs recorded on a computer readable memory medium and are executed by a computer system including CPU and memory devices. FIG. 23 shows a reference image A1, and FIG. 24 shows a comparison image B1. Region A2 in FIG. 23 is a scanning area for reference image A1 and region B2 in FIG. 24 is a scanning area for comparison image B1. These reference and comparison images are images input by commonly available methods such as TV camera.

Scanning area B2 for comparison image B1 and scanning area A2 for reference image A1 have the same absolute coordinates points, and the same size and shape. If the reference image A1 and the comparison image B1 are image taken with the same TV camera positioned in the same spot at the same magnification, then the scanning area will be viewing exactly the same region in both images. Although the scanning areas A2, B2 are local areas in the illustration, they can be expanded to include the entire areas of the images A1, B1.

Resemblance computation include calculation of the degree of resemblance between the scanning areas A2, B2. Many methods of computation are possible, but filtering process and integration process used in the embodied pattern extraction method described will be used. For example, in this case, as an example of filtering and integration processes, first derivatives of the logarithmic conversion data will be used. Interpolation results obtained from correlation factors calculated from the inner integral of the first derivative will be used to judge an abnormality.

Also, abnormality detection programs can also be based on corresponding equations.

In the following computational steps, the objective is to locate a region which contain a pattern similar to a predetermined pattern $Q_j$.

$$F_j(x,y) = \int\int \nabla \log Q_j(u,v) \cdot \nabla \log f(x+u, y+v) du dy / (\|\nabla \log Q_j\|^2 \|\nabla \log f(x+\bullet, y+\bullet)\|^2) \quad (20).$$

The variables $\|\nabla \log Q_j\|^2$ and $\|\nabla \log f(x+\bullet, y+\bullet)\|^2$ shown in equation (20) are functions respectively defined in equations (21) and (22) below.

$$\|\nabla \log Q_j\|^2 = \int\int \nabla \log Q_j(u,v) \cdot \nabla \log Q_j(u,v) du dy \quad (21),$$

$$\|\nabla \log f(x+\bullet, y+\bullet)\|^2 = \int\int \nabla \log f(x+u, y+v) \cdot \nabla \log f(x+u, y+v) du dy \quad (22).$$

In this case, computation of the degree of resemblance is carried out as follows.

$$F(x,y) = \int\int_\Omega \nabla \log f(x+u, y+v) \cdot \nabla \log g(x+u, y+v) du dy / (\|\nabla \log f\|^2_\Omega \|\nabla \log g\|^2_\Omega) \quad (23).$$

The variables $\|\nabla f\|^2_\Omega$ and $\|\nabla g\|^2_\Omega$ are functions respectively defined in equations (21) and (22) below.

$$\|\nabla \log f\|^2_\Omega = \int\int_\Omega \nabla \log f(x+u,y+v) \cdot \nabla \log f(x+u, y+v) du dy \quad (24),$$

$$\|\nabla \log g\|^2_\Omega = \int\int_\Omega \nabla \log g(x+u,y+v) \cdot \nabla \log g(x+u, y+v) du dy \quad (25).$$

In equations (23)–(25), g and f indicate reference image A1 and comparison image B1, respectively. Also, similarly log g and log f indicate, respectively, logarithmic conversion of reference image A1 and comparison image B1. Further, $\Omega$ indicates scanning area A2 and scanning area B2, and is given by $\{(x+u, y+v)|(u,v)\in\Omega\}$ and F(x,y) indicates the degree of resemblance between scanning areas A2, B2 of a target object represented by $\{(x+u, y+v)|(u,v)\in\Omega\}$.

Using the equations, when the reference image A1 and the comparison image B1 are similar, F(x,y) assumes a value close to 1. On the other hand, if they do not resemble each other, F(x,y) assumes either 0 or a negative value. In this case, if the value is close to –1, it indicates that the extracted image is inverted. However, as far as abnormality detection is concerned, it should be concluded that the images do no resemble. In actual abnormality monitoring, there are two case, one is that an abnormality involves the entire image while other is that an abnormality involves only a portion of an image.

As explained above, the present method enables to accurately detect abnormality on the basis of the degree of resemblance of scanning area A2 and scanning area B2 without being affected by illumination changes or shadows, so that when an apparent change caused by a pseudo change in an image (such as shadow of a building), the degree of resemblance will be high, and when a change is genuine, caused by an intrusion of an foreign object for example, the degree of resemblance will be low. Therefore, the present method is more reliable in detecting a true change in an image.

Although the present invention was described using specific embodiments, the examples are meant to be illustrative and not restrictive. It is clear that many other variations would be possible without departing from the basic approach, demonstrated in the present invention, that image data identification is made much more reliable by examining the derivative quantities of the original image.

What is claimed is:

1. A method for extracting a pattern from an image recorded by a programmed computer comprising the steps of:
   storing a reference for extraction;
   storing input images;
   converting pixel values of said input image for correcting any conflicts in converting analog camera data of an image to digital data, and gradient ($\nabla=(\partial/\partial x, \partial/\partial y)$, directional differential) processing;
   integrating the gradient of said reference pattern and the gradient of said input image to generate integrated results; and
   extracting the reference pattern similar to said input image according to said integrated results.

2. A method according to claim 1, wherein said converting step is carried out to separate surface reflectivity effects from intensity effect.

3. A method according to claim 1, wherein said step of integrating includes a convolution of an inner product of a reference pattern filter output and an input image filter output.

4. A method according to claim 2, wherein said step of integrating includes a convolution of an inner product of a reference pattern filter output and an input image filter output.

5. A method according to claim 1, wherein said step of integrating includes a convolution of an outer product of a reference pattern filter output and an input image filter output.

6. A method according to claim 2, wherein said step of integrating includes a convolution of an outer product of a reference pattern filter output and an input image filter output.

7. A method according to claim 1, wherein said step of integrating includes a difference of a convolution of a reference pattern filter output and an input image filter output.

8. A method according to claim 2, wherein said step of integrating includes a difference of a convolution of a reference pattern filter output and an input image filter output.

9. A method according to claim 2, wherein said step of integrating includes a step which gives the contribution which shows the degree of the difference between a plurality of reference patterns.

10. A method according to claim 3, wherein said step of integrating includes a step which gives the contribution which shows the degree of the difference between a plurality of reference patterns.

11. A method according to claim 4, wherein said step of integrating includes a step which gives the contribution which shows the degree of the difference between a plurality of reference patterns.

12. A method according to claim 9, wherein said step of weighting relates to a numerical technique of expressing a pattern shape factor common to a plurality of reference patterns, and prompts an extraction of a category of similar reference patterns instead of extracting one reference pattern according to an integration result.

13. A method according to claim 10, wherein said step of weighting relates to a numerical technique of expressing a pattern shape factor common to a plurality of reference patterns, and prompts an extraction of a category of similar reference patterns instead of extracting one reference pattern according to an integration result.

14. A method according to claim 11, wherein said step of weighting relates to a numerical technique of expressing a pattern shape factor common to a plurality of reference patterns, and prompts an extraction of a category of similar reference patterns instead of extracting one reference pattern according to an integration result.

15. A recording medium for executing extraction programs, for extracting a pattern from an image recorded by a computer, comprised by the steps of: storing reference patterns for extraction; storing input images; comprising a step of a logarithmic conversion with a table of pixel values of said input image for correcting any conflicts in converting analog camera data of an image to digital data, and a step of applying at least one processing step selected from the group consisting of a convolution and a gradient ($\nabla=(\partial/\partial x, \partial/\partial y)$, directional differential) processing; applying a filter means to reference patterns and input images; integrating filtered results of said reference pattern and filtered results of said input image to generate integrated results; and extracting a reference pattern according to said integrated results and specifying a location of said reference pattern in said input image.

16. A recording medium for executing extraction program, for extracting a pattern from an image recorded by a computer, comprised by the steps of: storing reference patterns for extraction; storing input images; comprising a step of a logarithmic conversion of pixel values of said input image for correcting any conflicts in converting analog camera data of an image to digital data, and a step of applying at least one processing step selected from the group consisting of a convolution and a gradient ($\nabla=(\partial/\partial x, \partial/\partial y)$, directional differential) processing; applying filter means to reference patterns and input images; integrating filtered results of said reference pattern and filtered results of said input image to generate integrated results; and extracting a reference pattern according to said integrated results and specifying a location of said reference pattern in said input image.

17. A recording medium according to claim 15, wherein said step of integrating includes a convolution of an inner product of a reference pattern filter output and an input image filter output thereby integrating said reference pattern filter output and said image filter output thereby integrating said reference pattern filter output and said image filter output.

18. A recording medium according to claim 16, wherein said step of integrating includes a convolution of an inner product of a reference pattern filter output and an input image filter output thereby integrating said reference pattern filter output and said image filter output thereby integrating said reference pattern filter output and said image filter output.

19. A recording medium according to claim 15, wherein said step of integrating includes a convolution of an outer product of a reference pattern filter output and an input image filter output thereby integrating said reference pattern filter output and said image filter output.

20. A recording medium according to claim 16, wherein said step of integrating includes a convolution of an outer product of a reference pattern filter output and an input image filter output thereby integrating said reference pattern filter output and said image filter output.

21. A recording medium according to claim 15, wherein said step of integrating includes a difference of a convolution of a reference pattern filter output and an input image filter output thereby integrating said reference pattern filter output and said image filter output.

22. A recording medium according to claim 16, wherein said step of integrating includes a difference of a convolution of a reference pattern filter output and an input image filter output thereby integrating said reference pattern filter output and said image filter output.

23. A recording medium according to claim 15, wherein said step of integrating includes a step of weighting according to a degree of contribution of a coordinate point in a reference pattern.

24. A recording medium according to claim 16, wherein said step of integrating includes a step of weighting according to a degree of contribution of coordinate point in a reference pattern.

25. A recording medium according to claim 17, wherein said step of integrating includes a step of weighting according to a degree of contribution of a coordinate point in a reference pattern.

26. A recording medium according to claim 18, wherein said step of integrating includes a step of weighting according to a degree of contribution of a coordinate point in a reference pattern.

27. A recording medium according to claim 24, wherein said step of weighting relates to a numerical technique of expressing a pattern shape factor common to a plurality of reference patterns, and prompts a n extraction of a category of similar reference patterns instead of extracting one reference pattern according to an integration result.

28. A recording medium according to claim 23, wherein said step of weighting relates to a numerical technique of expressing a pattern shape factor common to a plurality of reference patterns, and prompts an extraction of a category of similar reference patterns instead of extracting one reference pattern according to an integration result.

29. A recording medium according to claim 25, wherein said step of weighting relates to a numerical technique of expressing a pattern shape factor common to a plurality of reference patterns, and prompts an extraction of a category of similar reference patterns instead of extracting one reference pattern according to an integration result.

30. A recording medium according to claim 26, wherein said step of weighting relates to a numerical technique of expressing a pattern shape factor common to a plurality of reference patterns, and prompts an extraction of a category of similar reference patterns instead of extracting one reference pattern according to an integration result.

31. A method for recognizing a target pattern, in stored input images, which is similar to a plurality of pre-stored reference patterns and associated pattern locations, comprising the steps of: cropping of target regions for determining interim target regions; computing local similarities between said target pattern and said reference patterns in obtaining intermediate data by applying a local computation to said input image; logarithmic converting of pixel values of said input image for correcting any conflicts in converting analog camera data of an image to digital data; computing a degree of resemblance by comparing the gradient of said target pattern and said reference patterns; extracting local patterns according to results of said degree of resemblance to enable selecting similar reference patterns; restoring extracted regions so as to match with an original input image by verifying extracted pattern locations with reference pattern locations; deciding on a matching reference pattern for each extracted region; and outputting recognition results and associated reference pattern locations according to the results of comparison.

32. A method according to claim 31, wherein said target pattern in stored input images include numbers on license plates; and said reference patterns are characters including numerals, dots, kanji, hiragana and alphabet letters.

33. A computer-readable recording medium for executing a program to recognize a target pattern in stored input images, comprised by the steps of: cropping of target regions for determining interim target regions; computing local similarities between said target pattern and said reference patterns in obtaining intermediate data by applying a local computation to said input image; logarithmic converting of pixel values of said input image for correcting any conflicts in converting analog camera data of an image to digital data; computing a degree of resemblance by comparing the gradient of said target pattern and said reference patterns; extracting local patterns according to results of said degree of resemblance to enable selecting similar reference patterns; restoring extracted regions so as to match with an original input image by verifying extracted pattern locations with reference pattern locations; deciding on a matching reference pattern for each extracted region; and outputting recognition results and associated reference pattern locations according to results of comparison.

34. A method for detecting an image abnormality, by comparing a comparison image with a reference image so as to detect a change, comprising the steps of:

storing a plurality of reference images to be referenced against said comparison image;

storing a plurality of comparison images for comparing with said plurality of reference images;

specifying a scanning area in said comparison image and in said reference image for detection of an abnormality;

applying filter means, to said reference image and said comparison image so as to obtain intermediate data, including a step of applying a logarithmic conversion with a table of pixel values of said input image for correcting any conflicts in converting analog camera data of an image to digital data and a step of applying at least one processing step selected from the group consisting of a convolution and a gradient ($\nabla=(\partial/\partial x, \partial/\partial v)$, directional differential) processing;

computing a degree of resemblance of comparison image filtered results and reference image filtered results using similarity identification means selected from the group consisting of an inner product, an outer product, and correlation; and identifying an abnormality when said degree of resemblance is not more than a specific value, and issuing an abnormality warning as a result of a recognition process.

35. A recording medium for executing an image abnormality detection programs comprised by the steps of:

storing a plurality of reference images to be referenced against said comparison image;

storing a plurality of comparison images for comparing with said plurality of reference images;

specifying a scanning area in said comparison image and in said reference image for detection of an abnormality;

applying filter means, to said reference image and said comparison image so as to obtain intermediate data, including a step of applying a logarithmic conversion with a table of pixel values of said input image for correcting any conflicts in converting analog camera data of an image to digital data and a step of applying at least one processing step selected from the group consisting of a convolution and a gradient ($\nabla=(\partial/\partial x, \partial/\partial y)$, directional differential) processing;

computing a degree of resemblance of comparison image filtered results and reference image filtered results using similarity identification means selected from the group consisting of an inner product, an outer product, and correlation; and identifying an abnormality when said degree of resemblance is not more than a specific value, and issuing an abnormality warning as a result of a recognition process.

* * * * *